Patented Sept. 9, 1924.

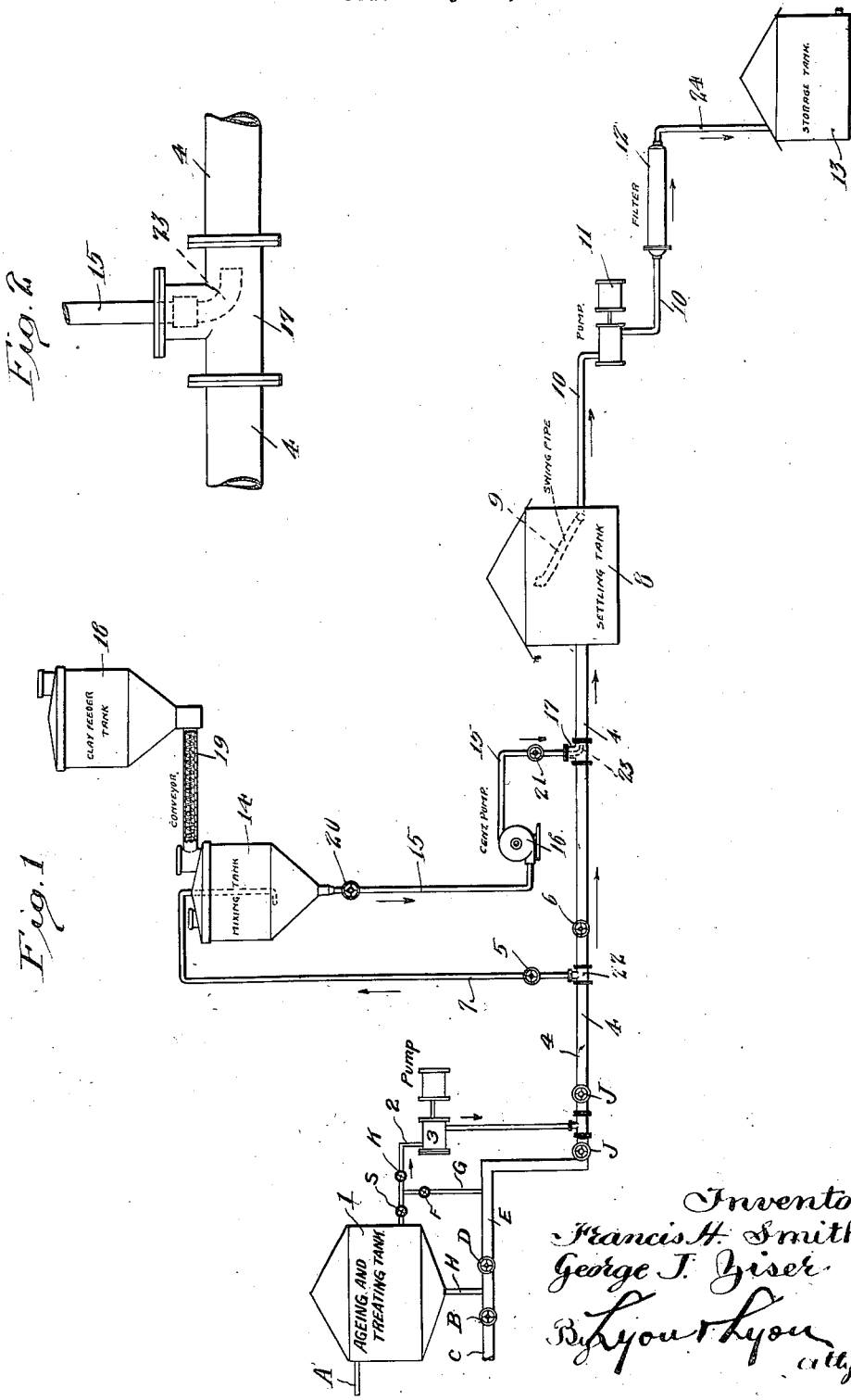

1,507,692

UNITED STATES PATENT OFFICE.

FRANCIS H. SMITH, OF EL SEGUNDO, AND GEORGE J. ZISER, OF LOS ANGELES, CALIFORNIA, ASSIGNORS TO STANDARD OIL COMPANY, OF SAN FRANCISCO, CALIFORNIA, A CORPORATION OF CALIFORNIA.

PROCESS OF PURIFYING LIGHT PETROLEUM OILS.

Application filed July 31, 1922. Serial No. 578,606.

*To all whom it may concern:*

Be it known that we, FRANCIS H. SMITH, a citizen of the United States, residing at El Segundo, in the county of Los Angeles and State of California, and GEORGE J. ZISER, a citizen of the United States, residing at Los Angeles, in the county of Los Angeles and State of California, have invented a new and useful Process of Purifying Light Petroleum Oils, of which the following is a specification.

This process relates to a method of treating light petroleum oils or distillates to produce a purified motor fuel or lamp oil.

An important object of the invention is to produce a motor fuel or lamp oil substantially free from any gums, resins, tarry matter or petroleum acids.

A further object of our invention is to produce a motor fuel or lamp oil which will not darken on standing or form gums, resins or tarry matter.

Another object of the invention is to produce a motor fuel or lamp oil which will not corrode copper, or tarnish or leave a residue in a copper vessel when evaporated at 212° F.

Another object of our invention is to accomplish such purification without the use of acid.

Another object of our invention is to produce a purified motor fuel or lamp oil with a minimum loss.

A still further object of our invention is to produce a more economical process of refining light petroleum oils.

Further objects of the invention will appear from the following description:

In the distillation of petroleum oils, the various distillates so obtained contain certain quantities of gums, resins, tarry matter, petroleum acids and tar forming constituents. It is well recognized in the art that these gums, resins, tarry matter, petroleum acids and tar forming constituents must be removed to form the highest grade of motor fuels or lamp oils. The methods of treating the distillates vary greatly according to the quality of the distillate to be treated. In a large number of cases it has hitherto been found necessary to treat these distillates with sulphuric acid. This acid treatment has been required for two reasons:

First, to remove all the gums, resins or tarry matter and second, to remove all those constituents in the distillate which tend on standing to form these gums, resins, or tarry matter. The sulphuric acid treatment involves the loss of distillate of as much as 5 per cent.

We have discovered that only a small percentage of the distillate so removed by the sulphuric acid is gum, resin or tar forming constituents. We have further discovered by introducing an aging step before treating the distillate, substantially all of the unstable hydrocarbons and tar forming constituents may be polymerized by the action of heat or light, and that such aged distillate will not, after the removal of the polymerized constituents, tend to darken or subsequently form any gummy matter. We have further discovered that substantially all of the unstable hydrocarbons or tar forming constituents can be practically completely polymerized by aging in a tank or container for a period of about two weeks. We have still further discovered that substantially all of the products of polymerization such as gums, resins, tarry matter may be removed from the distillate by treatment with an acid treated clay such as is described in the pending application of Chappell, Davis and Moore, Serial No. 488,952, filed August 1st, 1921. We have further discovered that any petroleum acids contained in said distillate may be removed by such clays along with the gum, resins or tarry matter if such petroleum acids are first neutralized with an alkali. We have further found that such treatment of distillates may be economically accomplished in an apparatus such as is herein described.

With the foregoing preliminary explanation the preferred method of treatment and apparatus may be more readily understood by reference to the following drawings:

Figure 1 is a diagrammatic view of an apparatus suitable for conducting our process.

Fig. 2 is an enlarged view of the connection shown at 17.

An aging tank 1 is connected by a line 2 to a pump 3 which connects through a line with a settling tank 8. The bottom of the tank 1 is provided with a cone bottom, which is connected by lines H, E and G to the suction pipe 2 between the tank 1 and pump 3. The pipe E is also connected to the line 4. C indicates a further line which may be employed as a discharge line for bent agents used in treating the oil or distillate in the tank 1. Valves S, K, I, D, F, and B are supplied to the various lines as clearly indicated in Figure 1. The settling tank 8 is provided with a swing pipe 9 connected to a line 10. The line 10 leads from the settling tank 8 through a pump 11 to a filter 12. A pipe 24 leads from the filter 12 to a storage tank 13. The line 4 is provided with a T-connection 22 to which is connected a line 7 smaller than the line 4. The line 7 is provided with a valve 5 as indicated and leads to a mixing tank 14. A clay feeder tank 18 is provided with a conveyor 19 and empties into the mixing tank 14. A line 15 is provided with valves 20 and 21 and leads from the mixing tank 14 to the line 4. A centrifugal pump 16 is provided in the line 15 between the valves 20 and 21. The line 15 communicates with the line 4 through a connection 17 which is provided with an elbow or jet 23 terminating in the center of the line 4 and positioned to discharge in the direction of flow in the pipe 4. A valve 6 is provided in the line 4 between the connections 17 and 22.

The method of treatment of the distillate and operation of the apparatus is as follows: The distillate to be treated is placed in the aging tank 1. The distillate is retained in this tank until substantially all natural polymerizing action is completed. This aging or polymerizing process with a familiar motor fuel requires about two weeks. The polymerizing process is complete when the distillate reaches its maximum color. The distillate is then tested for petroleum acids and if such acids exist in appreciable amounts the distillate is neutralized by processes well known in the art. When it is necessary or desirable to neutralize the distillate a sufficient quantity of water solution of caustic or other suitable base capable of neutralizing the petroleum acid present is introduced into the tank 1 through a line A. After the neutralization, the spent base may be withdrawn through the lines H and C. The distillate with or without this neutralizing, as the particular case may require, is then pumped through the line 4 by the pump 3. By operation of the valves 5 and 6 sufficient of the distillate is run into the tank 14 through the side line 7 to mix or entrain all the required treating clay. The clay is introduced into the mixing tank 14 by the conveyor 19 from the clay feeder tank, which has been previously filled with the pulverized acid treated clay produced by the method of said pending application, Serial No. 488,952, the method being also described in Patent No. 1,397,113, issued to Paul W. Prutzman, November 15, 1921, or other adsorbent material having the similar properties of adsorbing from the distillate produced color bodies, may be used. With a familiar motor fuel about one-sixteenth of the total distillate to be treated is so introduced into the tank 14. The conveyor 19 is operated to supply sufficient clay to treat all the distillate. The quantity of clay required varies with the distillate to be treated and ranges from 2,000 pounds of clay to 10,000 gallons of distillate to 2,000 pounds of clay to 800,000 gallons of distillate. In the majority of cases we have been enabled to use the smaller quantities of clay. The commingled distillate and clay pass from the mixing tank 14 through the line 15 to the line 4. The distillate and clay are discharged into the center of the line 4 by the elbow 23 and commingle with the distillate which did not pass through the mixing tank. Thus all the distillate is commingled and treated with the clay before passing into the settling tank. The commingled distillate and clay mixture is allowed a suitable time for settling in the tank 8 and then the distillate is drawn off through the swing pipe 9 by the pump 11, and filtered to remove the entrained clay by the filter 12. The filtered distillate is then run into the storage tank 13. It is not necessary to clean out the spent clay in the settling tank 8 except after long use since the quantity of clay normally used is very slight.

An important feature of the apparatus described is the separation of a portion of the distillate for mixing with and entraining the treating clay, and then introducing said mixture into the body of the distillate whereby the distillate as a whole is commingled with the clay in the pipe 4 while running toward the settling tank. This mixing of only a part of said distillate with the clay in a special apparatus, produces an important saving in the operation of the process.

While the process and apparatus described are well suited to the purposes of our invention it is understood that our invention is not limited to the precise forms herein described, but is of the scope embodied in the following claims.

We claim:

1. The process of treating those light hydrocarbon distillates which contain compounds that, upon standing, form color bodies, which process includes aging the distillate until the distillate has developed substantially its maximum color, and then removing the produced color bodies by contacting the distillate with an adsorptive material.

2. The process of treating those light hydrocarbon distillates which contan compounds that, upon standing, form color bodies, which process includes aging the distillate until the distillate has developed substantially its maximum color, neutralizing the acids present in the distillate, and then contacting the distillate with an adsorptive material to remove such color material and neutralized material.

Signed at El Segundo, California, this 24th day of July 1922.

FRANCIS H. SMITH.
GEORGE J. ZISER.